US012786816B2

(12) United States Patent
Jayasinghe Laddu et al.

(10) Patent No.: US 12,786,816 B2
(45) Date of Patent: Nov. 3, 2026

(54) TCI STATE ACTIVATION AND INDICATION METHOD

(71) Applicant: Nokia Technologies Oy, Espoo (FI)

(72) Inventors: Keeth Saliya Jayasinghe Laddu, Espoo (FI); Timo Koskela, Oulu (FI); Sanjay Goyal, Murray Hill, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 290 days.

(21) Appl. No.: 18/430,101

(22) Filed: Feb. 1, 2024

(65) Prior Publication Data

US 2024/0340719 A1 Oct. 10, 2024

Related U.S. Application Data

(60) Provisional application No. 63/457,216, filed on Apr. 5, 2023.

(51) Int. Cl.
*H04W 36/00* (2009.01)
*H04W 36/08* (2009.01)

(52) U.S. Cl.
CPC ....... *H04W 36/0072* (2013.01); *H04W 36/08* (2013.01)

(58) Field of Classification Search
None
See application file for complete search history.

(56) References Cited

U.S. PATENT DOCUMENTS

2022/0225286 A1 7/2022 Cirik et al.
2023/0106376 A1* 4/2023 Bai ........................ H04W 72/20 370/329
2024/0155445 A1* 5/2024 Hwang ............. H04W 36/0083
2024/0179587 A1* 5/2024 Yuan .................... H04W 72/231
2024/0276482 A1* 8/2024 Takeda .............. H04W 72/1263
2024/0364488 A1* 10/2024 Sun ........................ H04L 5/0094

FOREIGN PATENT DOCUMENTS

KR 20200074876 A 6/2020
WO 2022/029747 A1 2/2022

OTHER PUBLICATIONS

Extended European Search Report received for corresponding European Patent Application No. 24151332.4, dated Jul. 30, 2024, 10 pages.

(Continued)

*Primary Examiner* — Anh Ngoc M Nguyen
(74) *Attorney, Agent, or Firm* — Carter, DeLuca & Farrell LLP

(57) ABSTRACT

An apparatus configured to: receive an indication to activate one or more transmission configuration indication states associated with at least one of: a source cell, or at least one target cell; and update a list of activated transmission configuration indication states based, at least partially, on the received indication. An apparatus configured to: transmit, to a user equipment, an indication to activate one or more transmission configuration indication states associated with at least one of: a source cell, or at least one target cell; and transmit, to the user equipment, an indication of a codepoint value of a list of activated transmission configuration indication states.

13 Claims, 6 Drawing Sheets

(56) References Cited

OTHER PUBLICATIONS

"Discussion on L1/L2 based inter-cell mobility", 3GPP TSG-RAN WG2 Meeting #119 electronic, R2-2207681, Agenda: 8.4.2.2, Spreadtrum Communications, Aug. 17-26, 2022, 3 pages.
"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.
"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.
"3rd Generation Partnership Project; Technical Specification Group Radio Access Network; NR; Physical layer procedures for control (Release 17)", 3GPP TS 38.213, V17.4.0, Dec. 2022, pp. 1-258.
"Msc-generator", Sourceforge, Retrieved on Jan. 9, 2024, Webpage available at : https://sourceforge.net/projects/msc-generator/.
Jin et al., "Massive MIMO Evolution Towards 3GPP Release 18", IEEE Journal on Selected Areas in Communications, 2022, 23 pages.
U.S. Appl. No. 63/457,202, "Beam Indication for LTM Facilitating an Intermediate Filtering Step for TCI States", filed on Apr. 5, 2023, pp. 1-42.
U.S. Appl. No. 63/457,202, "Beam Indication for Layer 1/Layer 2 Triggered Mobility (LTM)", filed on Apr. 5, 2023, pp. 1-44.
"3rd Generation Partnership Project; Technical Specification Group Radio Access Network; NR; Multiplexing and channel coding (Release 17)", 3GPP TS 38.212, V17.5.0, Mar. 2023, pp. 1-203.

* cited by examiner

TCI STATE ACTIVATION AND INDICATION METHOD

TECHNICAL FIELD

The example and non-limiting embodiments relate generally to beam management and mobility between cells and, more particularly, to TCI state indication for beam management and/or mobility between cells.

BACKGROUND

It is known, in cellular communication, to provide a unified TCI states activation/deactivation MAC CE.

SUMMARY

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: receive an indication to activate one or more transmission configuration indication states associated with at least one of: a source cell, or at least one target cell; and update a list of activated transmission configuration indication states based, at least partially, on the received indication.

In accordance with one aspect, a method comprising: receiving, by a user equipment, an indication to activate one or more transmission configuration indication states associated with at least one of: a source cell, or at least one target cell; and updating a list of activated transmission configuration indication states based, at least partially, on the received indication.

In accordance with one aspect, an apparatus comprising means for performing: receiving an indication to activate one or more transmission configuration indication states associated with at least one of: a source cell, or at least one target cell; and updating a list of activated transmission configuration indication states based, at least partially, on the received indication.

In accordance with one aspect, a non-transitory computer-readable medium comprising program instructions stored thereon for performing at least the following: causing receiving of an indication to activate one or more transmission configuration indication states associated with at least one of: a source cell, or at least one target cell; and updating a list of activated transmission configuration indication states based, at least partially, on the received indication.

In accordance with one aspect, an apparatus comprising: at least one processor; and at least one memory storing instructions that, when executed by the at least one processor, cause the apparatus at least to: transmit, to a user equipment, an indication to activate one or more transmission configuration indication states associated with at least one of: a source cell, or at least one target cell; and transmit, to the user equipment, an indication of a codepoint value of a list of activated transmission configuration indication states.

In accordance with one aspect, a method comprising: transmitting, by a base station to a user equipment, an indication to activate one or more transmission configuration indication states associated with at least one of: a source cell, or at least one target cell; and transmitting, to the user equipment, an indication of a codepoint value of a list of activated transmission configuration indication states.

In accordance with one aspect, an apparatus comprising means for performing: transmitting, to a user equipment, an indication to activate one or more transmission configuration indication states associated with at least one of: a source cell, or at least one target cell; and transmitting, to the user equipment, an indication of a codepoint value of a list of activated transmission configuration indication states.

In accordance with one aspect, a non-transitory computer-readable medium comprising program instructions stored thereon for performing at least the following: causing transmitting, to a user equipment, of an indication to activate one or more transmission configuration indication states associated with at least one of: a source cell, or at least one target cell; and causing transmitting, to the user equipment, of an indication of a codepoint value of a list of activated transmission configuration indication states.

According to some aspects, there is provided the subject matter of the independent claims. Some further aspects are defined in the dependent claims.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
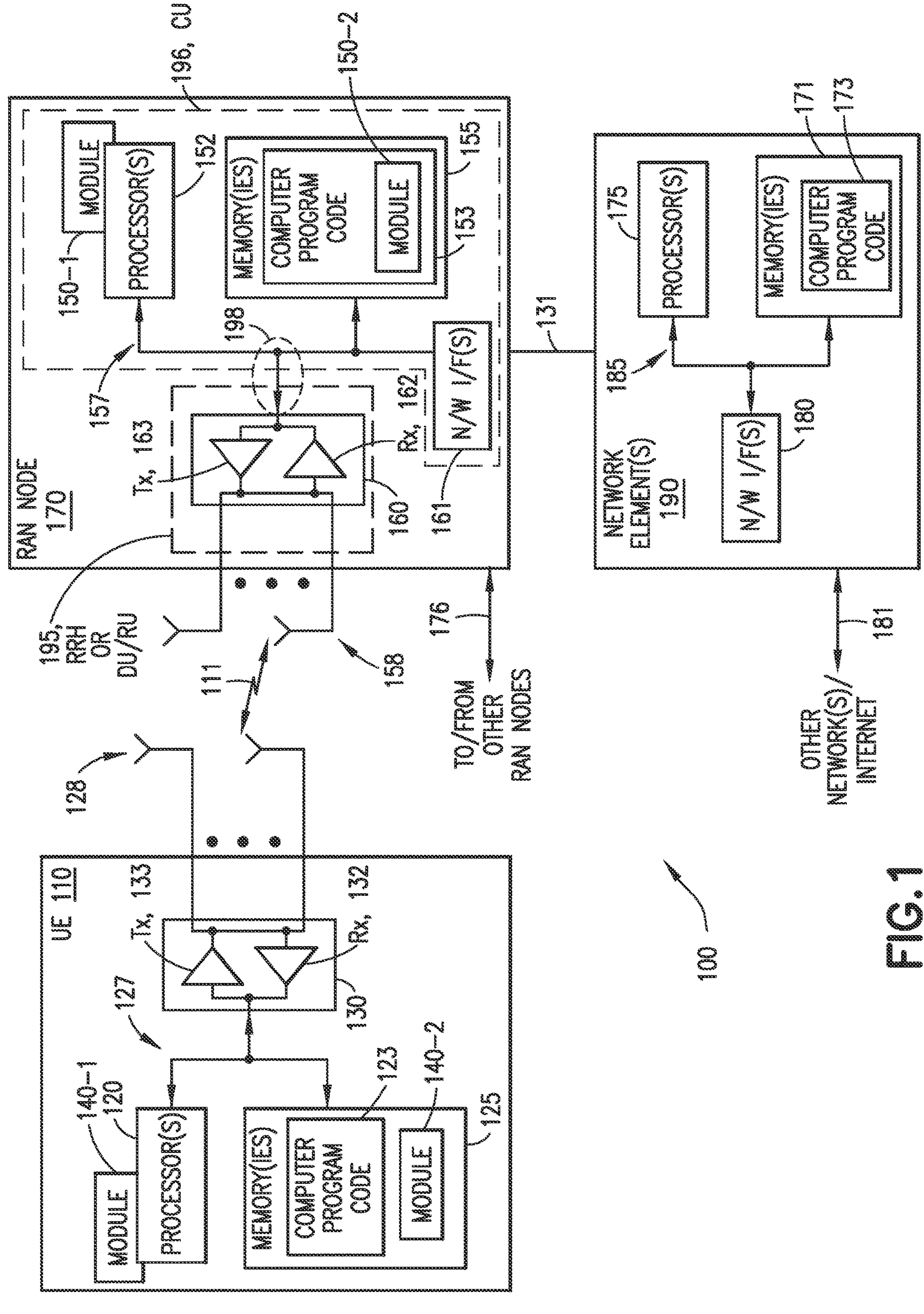
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
AMF access and mobility management function
BM beam management
BWP bandwidth part
CE control element
CRAN cloud radio access network
CU central unit
DCI downlink control information
DL downlink
DU distributed unit
eLCID extended logical channel identifier
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology gNB (or gNodeB) base station for 5G/NR, i.e., a node providing NR user plane and control plane protocol terminations towards the UE, and connected via the NG interface to the 5GC
ICBM inter-cell beam management
I/F interface
L1 layer 1
LTE long term evolution
LTM L1/L2 (i.e. lower layer) triggered mobility
MAC medium access control
MME mobility management entity
mTRP multiple TRP
ng or NG new generation
ng-eNB or NG-eNB new generation eNB
NR new radio
N/W or NW network
O-RAN open radio access network
PBCH physical broadcast channel
PCI physical cell identifier
PDCP packet data convergence protocol
PHY physical layer
RAN radio access network
RF radio frequency
RLC radio link control
RRC radio resource control
RRH remote radio head
RS reference signal
RSRP reference signal received power
RU radio unit
Rx receiver
SCS sub carrier spacing
SDAP service data adaptation protocol
SGW serving gateway
SMF session management function
SMTC SS/PBCH Block Measurement Timing Configuration
SS synchronization signal
SSB synchronization signal block
TCI transmission configuration indication
TRP transmission and reception point
Tx transmitter
UE user equipment (e.g., a wireless, typically mobile device)
UL uplink
UPF user plane function
VNR virtualized network function Turning to FIG. 1, this figure shows a block diagram of one possible and non-limiting example in which the present disclosure may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A “circuit” may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein may generally relate to transmission configuration indication (TCI) states.

In RAN1 111 November 2022, the following was agreed:

" . . . . Agreement

For beam indication timing for Rel-18 LTM,

Support Scenario 2: Beam indication together with cell switch command,

For Rel-17 unified TCI framework,

Beam indication indicates TCI state for each target serving cell

FFS: Scenario 1: Beam indication before cell switch command

FFS: Scenario 3: Beam indication after cell switch command

FFS: Activation of TCI state(s) of target serving and/or candidate cell(s) . . . "

In RAN1 112 February-March 2023, the following was agreed:

" . . . . Agreement

For L1-RSRP measurement RS configuration

For SSB based L1-RSRP measurement:

As a starting point, at least the following information needs to be provided to a UE, e.g.

For intra- and inter-frequency: PCI or logical ID (e.g., as being defined in R17 ICBM), time domain (e.g. SMTC or periodicity and SSB position in burst)

For inter-frequency: frequency domain location (e.g. center frequency), SCS

FFS: transmission power (for pathloss calculation)

Note: other parameters included in the configuration can be further discussed

Including above agreement into the LS

The detailed design of RRC structure is up to RAN2, and send an LS to RAN2 to request to work on the RRC structure design on the measurement configuration.

Following RAN1 understanding will be provided in the LS

RAN1 has discussed the following configuration options for L1 measurement configurations for SSB till RAN1 #112:

Option 1) Configurations for L1 measurement RS is provided under ServingCellConfig for the serving cells is useful to reuses the mechanism for Rel-17 ICBM and necessary information to support inter-frequency measurement will be added there.

Option 2) Configurations for L1 measurement RS is provided separately from ServingCellConfig for the serving cells and CellGroupConfig for the candidate cells is useful to avoid the duplicated configurations for L1 measurement RSs, [and avoid UE to process configurations provided under CellGroupConfig for the candidate cells]

Option 3) Configurations for L1 measurement RS is provided under CellGroupConfig for the candidate cells can achieve the similar benefit as Option 2) by directly referring to the candidate cell configurations.

Note RAN2 has a full flexibility to design the whole RRC structure design.

RAN1 believes this is RAN2 expert region, and respectfully asks RAN2 to finalize the RRC structure design after RAN1 finalizes the discussion on RRC parameters.

It is noted that RAN1 foresees the necessity of similar discussions on TCI state pool for candidate cells and L1 measurement report configurations . . . "

Features as described herein may relate to TCI state list/pool for candidate cells. Candidate cells may comprise of current serving cell. Features as described herein may further relate to TCI state list/pool for candidate cells and serving cells.

Features as described herein may relate to L1 measurement report configuration.

The following was also agreed:

" . . . . Agreement

The agreement on scenario 2 (Beam indication together with cell switch command) at RAN1 #111 is further clarified as the following:

Beam indication for the target cell(s) is conveyed in the MAC CE used for LTM triggering for scenario 2 . . . "

The following was also agreed:

" . . . Agreement

At least for Rel-17 unified TCI framework based beam indication included in cell switch command (i.e. scenario 2), beam indication applies to signals/channels that follow or are configured to follow Rel-17 unified TCI at the target cell(s)

FFS: beam indication for mTRP case . . . "

Features as described herein may relate to LTM triggering scenario 2 (i.e. beam indication together with cell switch command). In scenario 2, LTM triggering may be performed using a MAC CE. Features described herein may relate also to beam management (serving cell beam management) and beam management after the UE switches to a new candidate cells (that becomes a serving cell).

Features as described herein may relate to beam indication and/or activation. Currently, in RAN1, there is a discussion on how to provide a beam indication in the lower layer triggered mobility (LTM) using the Rel-17 unified TCI-based framework. At least for Scenario 2 (i.e. beam indication in the cell switch command), RAN1 agreed that the beam indication for the target cell(s) is conveyed in the MAC CE used for LTM triggering scenario 2. Here, beam activation may be provided before the cell switch command, but the beam indication is only provided in the cell switch command (MAC CE).

For Scenario 1 (i.e. beam indication before cell switch command), the details could be clearer, as a downlink control information (DCI)-based beam indication may be used with Rel-17 unified TCI state framework; how such DCI-based beam indication fits for the LTM scenario may be clarified. In particular, when the UE is in the source cell, the DCI-based beam indication may be used to switch the source cell beam (e.g. for intra/inter-cell beam management), and that beam indication may refer to an activated source cell TCI state list to interpret the TCI codepoint provided in the DCI. Similarly, the TCI codepoint provided in the DCI may require a different interpretation for LTM-related beam indication. In summary, DCI-based beam indication may be interpreted separately for the source cell and LTM.

Features as described herein may relate to unified TCI state activation/deactivation via MAC CE. TS 38.321 describes the Unified TCI States Activation/Deactivation MAC CE as follows:

" . . . 6.1.3.47 Unified TCI States Activation/Deactivation MAC CE

The Unified TCI States Activation/Deactivation MAC CE is identified by a MAC subheader with eLCID as specified in Table 6.2.1-1b. It has a variable size consisting of following fields:

Serving Cell ID: This field indicates the identity of the Serving Cell for which the MAC CE applies. The length of the field is 5 bits. If the indicated Serving Cell is configured as part of a simultaneousU-TCI-UpdateList1, simultaneousU-TCI-UpdateList2, simultaneousU-TCI-UpdateList3 or simultaneousU-TCI-UpdateList4 as specified in TS 38.331 [5], this MAC CE applies to all theServing Cells in the set simultaneousU-TCI-UpdateList1, simultaneousU-TCI-UpdateList2, simultaneousU-TCI-UpdateList3 or simultaneousU-TCI-UpdateList4, respectively;

DL BWP ID: This field indicates a DL BWP for which the MAC CE applies as the codepoint of the DCI bandwidth part indicator field as specified in TS 38.212 [9]. The length of the BWP ID field is 2 bits;

UL BWP ID: This field indicates a UL BWP for which the MAC CE applies as the codepoint of the DCI bandwidth part indicator field as specified in TS 38.212 [9]. The length of the BWP ID field is 2 bits;

Pi: This field indicates whether each TCI codepoint has multiple TCI states or single TCI state. If Pi field is set to 1, it indicates that ith TCI codepoint includes the DL TCI state and the UL TCI state. If Pi field is set to 0, it indicates that ith TCI codepoint includes only the DL/joint TCI state or the UL TCI state. The codepoint to which a TCI state is mapped is determined by its ordinal position among all the TCI state ID fields;

D/U: This field indicate whether the TCI state ID in the same octet is for joint/downlink or uplink TCI state. If this field is set to 1, the TCI state ID in the same octet is for joint/downlink. If this field is set to 0, the TCI state ID in the same octet is for uplink;

TCI state ID: This field indicates the TCI state identified by TCI-StateId as specified in TS 38.331 [5]. If D/U is set to 1, 7-bits length TCI state ID i.e. TCI-StateId as specified in TS 38.331 [5] is used. If D/U is set to 0, the most significant bit of TCI state ID is considered as the reserved bit and remainder 6 bits indicate the UL-TCIState-Id as specified in TS 38.331 [5]. The maximum number of activated TCI states is 16;

R: Reserved bit, set to 0 . . . ”

Figure 2:
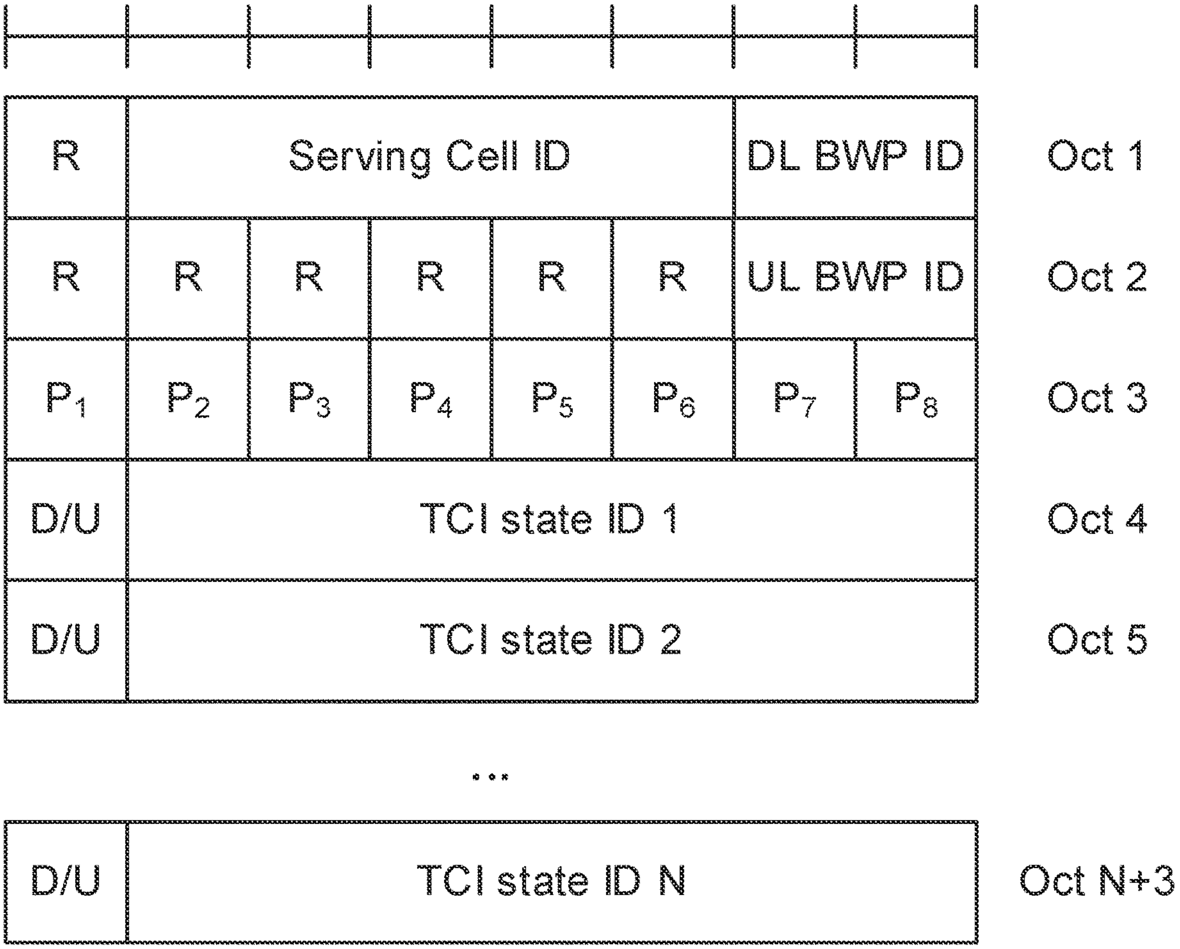
FIG. 2 is a diagram illustrating features as described herein.

Referring now to FIG. 2, illustrated is an example of a unified TCI state activation/deactivation MAC CE.

In an example embodiment, a mechanism may be implemented for indicating TCI state(s) for source cell and/or LTM candidate cell(s) (e.g. target cell). In an example embodiment, the indicated TCI state may be referred/selected/determined from the combined/incremental list of TCI states, which may be activated with one or more different unified TCI state MAC CEs. In an example embodiment, the DCI indication may be LTM specific, and may indicate/point to a codepoint that may map to the activated TCI state in the combined list of (activated) TCI states.

In an example embodiment, the UE may receive different MAC CEs activating the TCI states for different LTM candidate cells (e.g. target cell) and source cell, and all activated TCI states may be added to a combined list of activated TCI states.

In an example embodiment, the activated TCI state ID space may be common for all the TCI states of the (LTM) candidate cells and source cell that are activated by the MAC CE(s). As an example, the TCI state activation MAC-CE may have running/continuing codepoint numbering/indexing.

Figure 3:
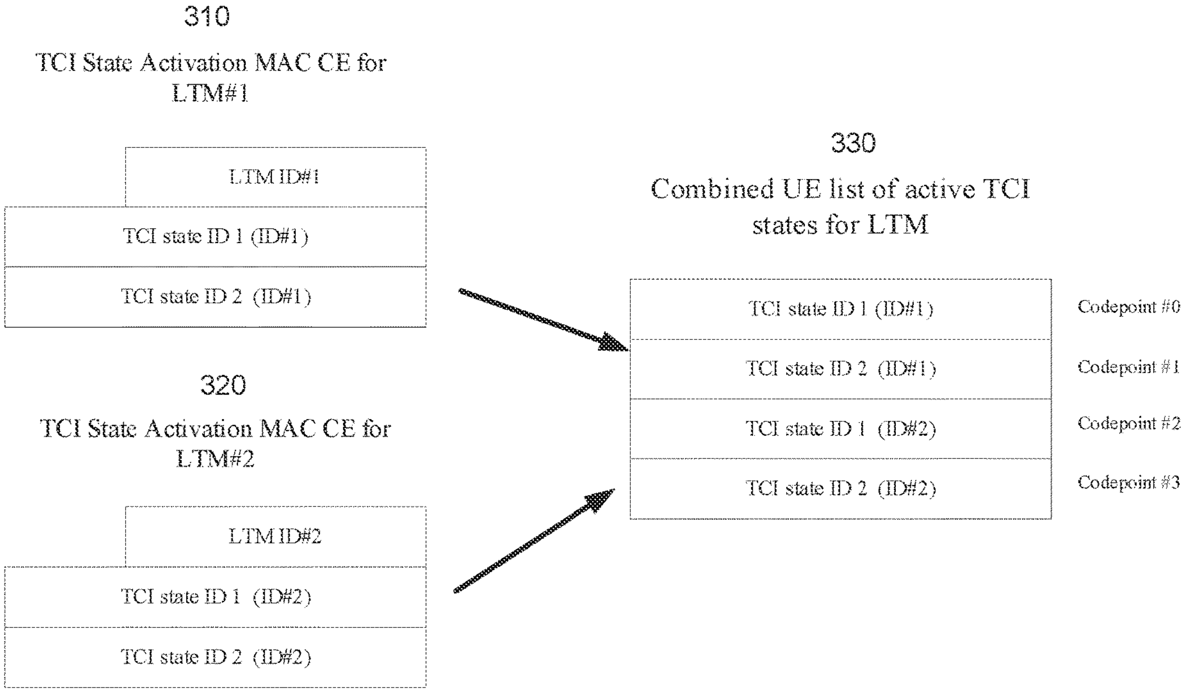
FIG. 3 is a diagram illustrating features as described herein.

In an example embodiment, in continuing codepoint numbering/indexing, each subsequent MAC CE that activates a TCI state(s) may have an incremental value of a codepoint in the UE list of active TCI states for LTM (see, e.g., FIG. 3).

In an example embodiment, codepoint numbering/indexing may be limited to a maximum, which may be associated with the TCI codepoint size of the DCI. Alternatively, a maximum may be UE specific (i.e. based on UE capability). Configuration may be provided by the network using RRC signaling. The configuration may be part of the LTM configuration. In some examples, the maximum value may be specific for one or more candidate cells. For example, the maximum may be 8 codepoints if the DCI field size for TCI state indication is 3 bits. In some examples, the maximum size may be configurable. Configuration may be provided by the network. In an example, the maximum size may be configured to be N (e.g. N=8), and may range up to M (e.g. M=16). The maximum size may be specific to LTM operation (i.e. the configuration or the maximum number may be applied if the TCI states are for LTM beam indication purposes).

In an example embodiment, codepoint numbering/indexing may restart after the maximum (which may be associated with the TCI codepoint size of the DCI) for any future received MAC-CE activations by replacing the previously activated TCI states. In some examples, if the maximum is reached (or will be reached with the new message, MAC CE) and UE receives a new activation message, the UE may determine that the most recent MAC CE provides the active TCI state list (instead of replacing the part of the previous list with new entries). In some examples, if the maximum is reached (or will be reached with the new message, MAC CE) and UE receives new TCI state activation message (e.g. MAC CE), the UE may determine to replace the TCI states starting from the earliest activated (i.e. keeping the most recently activated TCI states as activated), with the most recent MAC CE provides the active TCI state list.

In an example embodiment, when the UE receives the beam indication, the beam indication (DCI codepoint) may refer to the UE list with combined TCI state activations (e.g. combined/incremental TCI state list). For example, a single beam indication field may be used for any activated TCI state (e.g. for different LTM candidate/target cells). In some examples, a bit field in the DCI may indicate whether the beam indication refers to the incremental list or, for example, an intra cell (or inter-cell beam management) beam management list (e.g. for the serving cell).

In an example embodiment, the MAC CE may comprise a field that indicates whether the provided MAC CE will provide the TCI states to the combined/incremental list, or whether the list is reset. If the MAC CE comprises a bit field indicating a specific value (e.g. reset), the UE may assume that previous TCI states are not valid (or are de-configured or are not activated or are de-activated), and that the TCI state indexing (the codepoint indexing) may start from the lowest value (e.g. #0). If the MAC CE comprises a bit field indicating a specific value (e.g. increment/combine), the UE may assume that previously activated TCI states are maintained, and that the TCI state indexing (the codepoint indexing) may start from the next codepoint value that was the highest codepoint value in the previous MAC CE (e.g. #3 in the previous, the starting codepoint value is #4). The reset operation or combination operation values provided in the MAC CE may be list specific. As an example, at least one filed in the MAC CE may indicate to which TCI state activation list the UE applies the TCI states provided by the MAC CE. As an example, the UE may have one or more combined/incremental lists. Each list may be associated with a different set of cells. Each list may be referred to with an identifier.

In an example embodiment, there may be one or more incremental lists (of activated TCI states) maintained by the UE, and the MAC CE may have a field indicating which list (e.g. via list ID) may be incremented/combined or reset. The list may be further referred to with an ID, for example when using DCI-based beam indication. As an example, the UE may have a single list that is used for intra-cell beam management (including inter-cell beam management) and LTM. In another example, the UE may have a single (combined/incremental) list for LTM purposes (e.g. for beam indication before the or as part of cell switch command). In another example, the UE may have one list (combined/incremental) for intra-cell (and inter-cell) beam management purposes (e.g. for beam indication).

In an example embodiment, there may be a field in a MAC CE that indicates the starting codepoint value for the TCI states that may be activated by the MAC CE. The starting codepoint value may be one of the codepoint values, allowed by the MAC CE (i.e. if up to 8 TCI states can be activated, then a 3-bit field may be used). Alternatively, the starting codepoint value may be predetermined (e.g. 1 bit value) where the first value may indicate the first starting codepoint value, and the second value may indicate the second starting codepoint value. If the maximum is reached, or will be reached based on the number of activated TCI States provided in the MAC CE, the UE may replace the TCI states (earliest activated TCI States) starting from the lowest codepoint value (and continue in sequential order).

In any of the example embodiments, if the UE determines that it may need to replace one or more TCI states that are currently active with new TCI states provided in the (most recent) MAC CE, it may determine to start replacing from the lowest codepoint value (e.g. #0) (and continue in sequential order).

In an example embodiment, the combined TCI state list operation may be carried out using the legacy MAC CE (e.g. unified TCI state activation as in R17) or a new MAC CE that is used for activating TCI states (intra-cell and/or LTM). The combined TCI state list operation as described herein may be carried out using a message that activates TCI states (e.g. a MAC CE and/or RRC message or DCI message in any combination).

In an example, the TCI state codepoint indication (or a TCI state ID) may be provided in a message that comprises cell switch command. Receiving this command may indicate to the UE that it may switch to (e.g. handover to) the new target cell indicated by the command. Prior to the command, or in the command, the UE may receive beam indication for the TCI state (beam) that is to be applied in the new target cell. In one example, if the UE switches to a new cell, it may determine to keep the current list of active TCI states (from which the TCI state was indicated) as an active TCI state list in the new target cell.

Referring now to FIG. 3, illustrated is an example of forming a combined/incremental list of activated TCI states. A TCI state activation MAC CE for LTM #1 (310) may comprise TCI state ID1 (ID #1, note that this ID # may refer to the candidate cell ID/index/LTM configuration ID or the like) and TCI state ID 2 (ID #1). The current serving cell may be associated with an LTM #X identifier (note that this ID may refer to the candidate cell ID/index/LTM configuration ID or the like). A TCI state activation MAC CE for LTM #2 (320) may comprise TCI state ID1 (ID #2) and TCI state ID 2 (ID #2). The TCI state activation MAC CE for LTM #1 (310) and the TCI state activation MAC CE for LTM #2 (320) may be combined to form a combined UE list of active TCI states for LTM (330). For example, both of the TCI state activations may be added to a same TCI state list/pool. The combined UE list of active TCI states for LTM (330) may comprise at codepoint #0 TCI state ID 1 (ID #1), TCI state ID 2 (ID #1), TCI state ID 1 (ID #2), and TCI state ID 2 (ID #2).

In an example embodiment, the DCI based beam indication for the combined list of activated TCI may comprise LTM flag+TCI codepoint. The UE may interpret DCI based beam indication to refer to the combined list of active TCI states for LTM. The LTM flag in the DCI may indicate that the list the UE interprets for the DCI based beam indication is for LTM (e.g. with reference to the combined list of active TCI states for LTM). In an example, if multiple lists are used/configured, the DCI may comprise a field referring to the list for which the DCI indicates a TCI codepoint.

In an example embodiment, the DCI based beam indication for the combined list of activated TCI may comprise a common TCI codepoint for Intra-cell BM/inter-cell beam management (ICBM) and LTM. The UE may interpret the DCI based beam indication to refer to the combined list of active TCI states for LTM and ICBM). The TCI state indicated by the codepoint may indicate the cell switch/ICBM. If the ICBM is configured for the UE, it may perform the ICBM communication until a cell switch command is received. In an example, if multiple lists are used/configured, the DCI may comprise a field referring to the list for which the DCI indicates a TCI codepoint.

Figure 4:
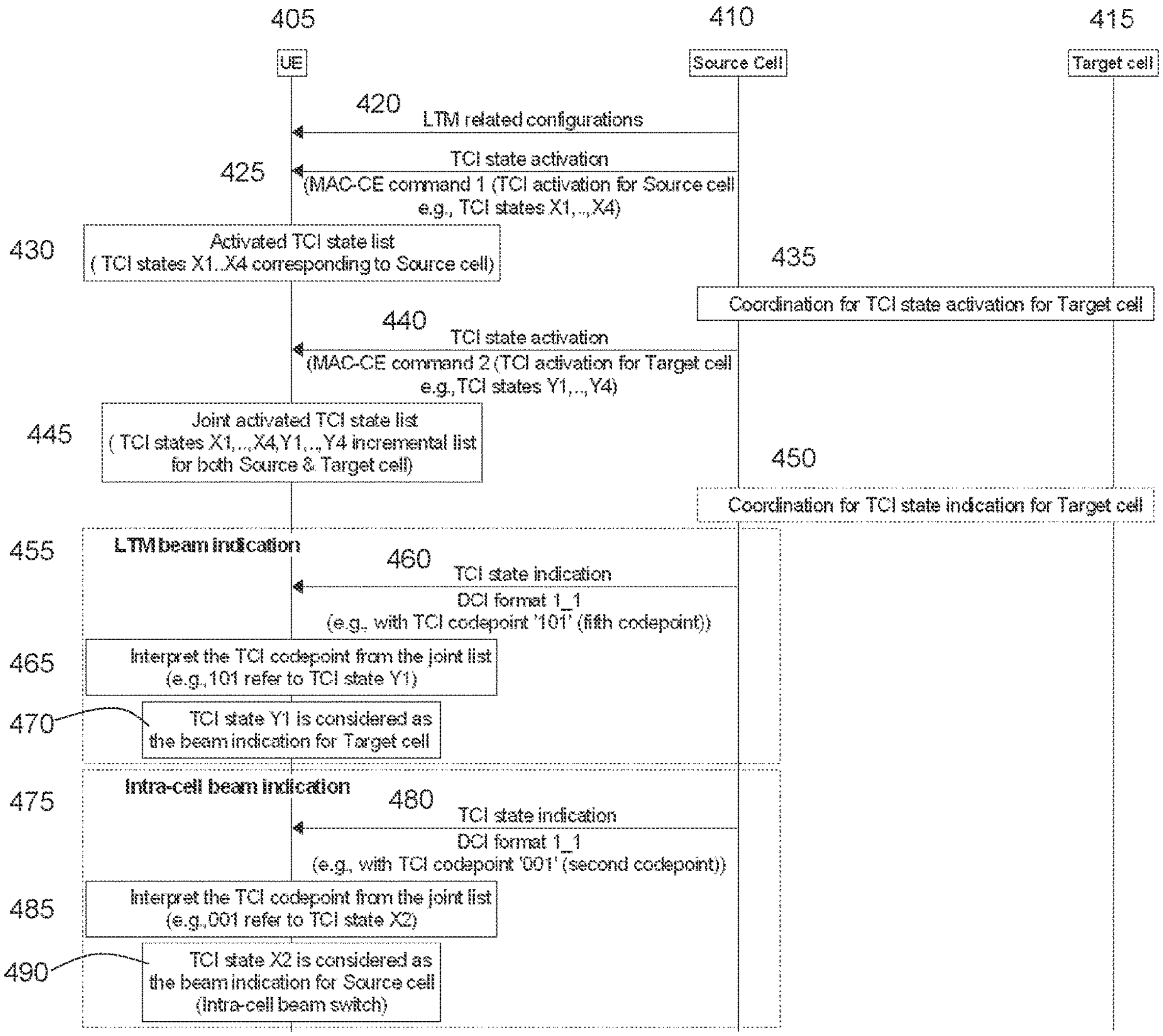
FIG. 4 is a diagram illustrating features as described herein.

Referring now to FIG. 4, illustrated is a signaling diagram including examples of LTM beam indication and intra-cell beam indication. At 420, the source cell (410) may transmit, to the UE (405), one or more LTM related configurations. At 425, the source cell (410) may transmit, to the UE (405), a TCI state activation. The TCI state activation may comprise a MAC-CE command 1, which may include TCI activation for the source cell (410) (e.g. TCI states X1, . . . . X4). At 430, the UE (405) may generate an activated TCI state list based on the received MAC CE command 1 (425). In other words, the UE (405) may update an activated TCI state list based on the received MAC CE command 1 (425). The activated TCI state list may include TCI states X1 . . . . X4 corresponding to the source cell (410). At 435, the source cell (410) may perform coordination for TCI state activation for the target cell (415).

At 440, the source cell (410) may transmit, to the UE (405), a TCI state activation. The TCI state activation may comprise a MAC CE command 2, which may include TCI activation for the target cell (415) (e.g. TCI states Y1, . . . , Y4). At 445, the UE (405) may generate a joint activated TCI state list based on the received MAC CE command 2 (440). In other words, the UE (405) may update a joint activated TCI state list based on the received MAC CE command 2 (440). The joint activated TCI state list (e.g. combined and/or incremental list) may include TCI states X1, . . . , X4, Y1, . . . , Y4 in an incremental list for both the source cell (410) and the target cell (415). Optionally, at 450, the source cell (410) may perform coordination for TCI state activation for the target cell (415).

In an example embodiment, only one of 420 or 440 may be performed; in other words, the UE may receive only one command to update a TCI state list. The example of FIG. 4 is not limiting.

At 455, LTM beam indication may be transmitted and received. In particular, at 460, the source cell (410) may transmit, to the UE (405), a TCI state indication. For example, the TCI state indication may comprise a DCI with format 1_1, which may include an indication of a TCI codepoint. In the example of FIG. 4, the TCI codepoint '101' may be included, which may serve to indicate the fifth codepoint. At 465, the UE (405) may interpret the TCI codepoint from the joint list. For example, the UE (405) may determine that the indicated TCI codepoint, for example 101, refers to TCI state Y1. At 470, the UE (405) may determine that the TCI state Y1 is the beam indicated for the target cell.

At 475, Intra-cell beam indication may be transmitted and received. In particular, at 480, the source cell (410) may transmit, to the UE (405), a TCI state indication. For example, the TCI state indication may comprise a DCI with format 1_1, which may include an indication of a TCI codepoint. In the example of FIG. 4, the TCI codepoint '001' may be included, which may serve to indicate the second codepoint. At 485, the UE (405) may interpret the TCI codepoint from the joint list. For example, the UE (405) may determine that the indicated TCI codepoint, for example 001, refers to TCI state X2. At 490, the UE (405) may determine that the TCI state X2 is the beam indicated for the source cell (i.e. intra-cell beam switch).

Figure 5:
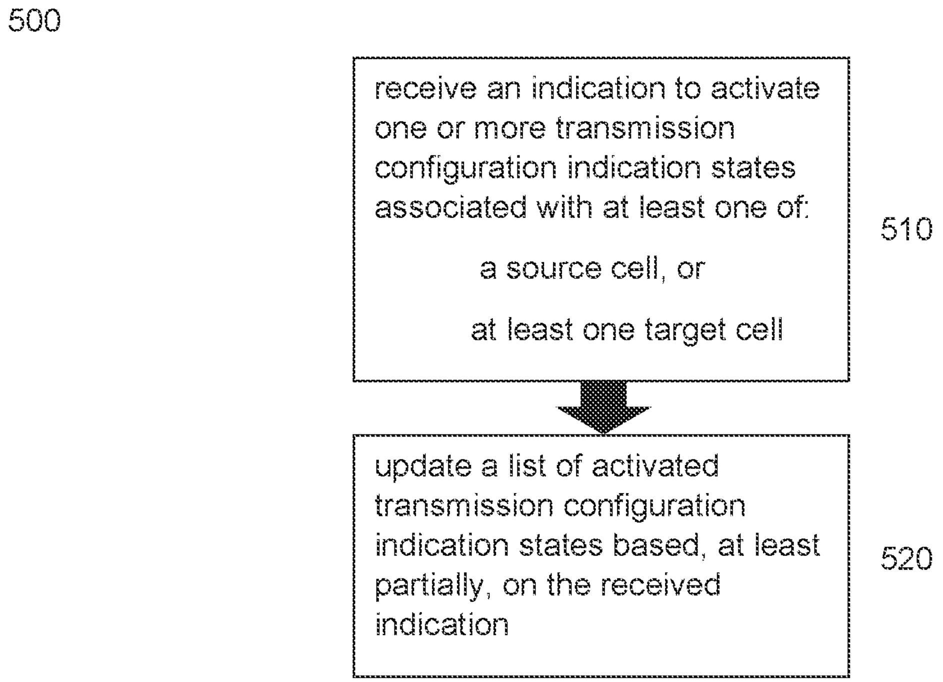
FIG. 5 is a flowchart illustrating steps as described herein.

FIG. 5 illustrates the potential steps of an example method 500. The example method 500 may include: receiving an indication to activate one or more transmission configuration indication states associated with at least one of: a source cell, or at least one target cell, 510; and updating a list of activated transmission configuration indication states based, at least partially, on the received indication, 520. The example method 500 may be performed, for example, with or by a UE.

Figure 6:
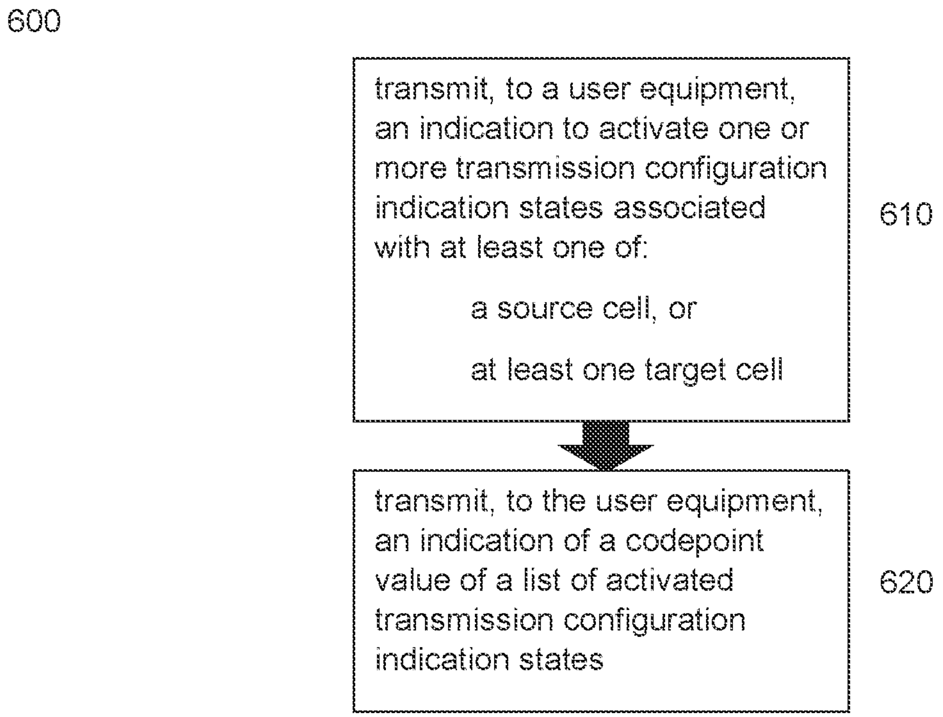
FIG. 6 is a flowchart illustrating steps as described herein.

FIG. 6 illustrates the potential steps of an example method 600. The example method 600 may include: transmitting, to a user equipment, an indication to activate one or more transmission configuration indication states associated with at least one of: a source cell, or at least one target cell, 610; and transmitting, to the user equipment, an indication of a codepoint value of a list of activated transmission configuration indication states, 620. The example method 600 may be performed, for example, with or by a base station, gNB, network entity, source cell, etc.

In accordance with one example embodiment, an apparatus may comprise: at least one processor; and at least one memory storing instructions that, when executed by the at least one processor, cause the apparatus at least to: receive an indication to activate one or more transmission configuration indication states associated with at least one of: a source cell, or at least one target cell; and update a list of activated transmission configuration indication states based, at least partially, on the received indication.

The indication may be received via a medium access control control element.

The example apparatus may be further configured to: receive a lower layer triggered mobility configuration for the at least one target cell.

The example apparatus may be further configured to: receive an indication of a codepoint value of the list of activated transmission configuration indication states; and determine a transmission configuration indication state of the list of activated transmission configuration indication states based, at least partially, on the indicated codepoint value.

The determined transmission configuration indication state may be configured to be used as an indicated beam for the at least one target cell.

The indication of the codepoint value may further comprise a lower layer triggered mobility flag.

The determined transmission configuration indication state may be configured to be used as an indicated beam for the source cell.

The indication of the codepoint value may be received via a downlink control information message.

The list of activated transmission configuration indication states may be continuously codepoint indexed.

An indexing of the list of activated transmission configuration indication states may be configured to be restarted based, at least partially, on a maximum number of codepoint values contained in the list of activated transmission configuration indication states.

The example apparatus may be further configured to: receive an indication to reset the list of activated transmission configuration indication states; and remove activated transmission configuration indication states from the list of transmission configuration indication states in response to the indication to reset the list.

The indication may comprise an indication to reset the list of activated transmission configuration indication states, wherein the example apparatus may be further configured to: remove at least one activated transmission configuration indication state from the list of transmission configuration indication states in response to the indication to reset the list; and activate the one or more transmission configuration indication states provided with the indication.

The indication may comprise an indication to combine the one or more transmission configuration indication states with the list of activated transmission configuration indication states.

The indication may comprise an indication to increment the list of activated transmission configuration indication states with the one or more transmission configuration indication states.

The example apparatus may be further configured to: add the one or more transmission configuration indication states to the list of activated transmission configuration indication states, after at least one transmission configuration indication state that is in the list of activated transmission configuration indication states, starting at a next codepoint value.

The indication may comprise an identifier of the list of activated transmission configuration indication states.

The indication may comprise an indication of a starting codepoint value for adding the one or more transmission configuration indication states to the list of activated transmission configuration indication states.

The indication may be received via one of: a transmission configuration indication state specific medium access control control element, an intra-cell medium access control control element, or a lower layer triggered mobility medium access control control element.

In accordance with one aspect, an example method may be provided comprising: receiving, by a user equipment, an indication to activate one or more transmission configuration indication states associated with at least one of: a source cell, or at least one target cell; and updating a list of activated transmission configuration indication states based, at least partially, on the received indication.

The indication may be received via a medium access control control element.

The example method may further comprise: receiving a lower layer triggered mobility configuration for the at least one target cell.

The example method may further comprise: receiving an indication of a codepoint value of the list of activated transmission configuration indication states; and determining a transmission configuration indication state of the list of activated transmission configuration indication states based, at least partially, on the indicated codepoint value.

The determined transmission configuration indication state may be configured to be used as an indicated beam for the at least one target cell.

The indication of the codepoint value may further comprise a lower layer triggered mobility flag.

The determined transmission configuration indication state may be configured to be used as an indicated beam for the source cell.

The indication of the codepoint value may be received via a downlink control information message.

The list of activated transmission configuration indication states may be continuously codepoint indexed.

An indexing of the list of activated transmission configuration indication states may be configured to be restarted based, at least partially, on a maximum number of codepoint values contained in the list of activated transmission configuration indication states.

The example method may further comprise: receiving an indication to reset the list of activated transmission configuration indication states; and removing activated transmission configuration indication states from the list of transmission configuration indication states in response to the indication to reset the list.

The indication may comprise an indication to reset the list of activated transmission configuration indication states, wherein the example method may further comprise: removing at least one activated transmission configuration indication state from the list of transmission configuration indication states in response to the indication to reset the list; and activating the one or more transmission configuration indication states provided with the indication.

The indication may comprise an indication to combine the one or more transmission configuration indication states with the list of activated transmission configuration indication states.

The indication may comprise an indication to combine the one or more transmission configuration indication states with the list of currently/previously activated transmission configuration indication states.

The indication may comprise an indication to increment the list of activated transmission configuration indication states with the one or more transmission configuration indication states.

The example method may further comprise: adding the one or more transmission configuration indication states to the list of activated transmission configuration indication states, after at least one transmission configuration indication state that is in the list of activated transmission configuration indication states, starting at a next codepoint value.

The indication may comprise an identifier of the list of activated transmission configuration indication states.

The indication may comprise an indication of a starting codepoint value for adding the one or more transmission configuration indication states to the list of activated transmission configuration indication states.

The indication may be received via one of: a transmission configuration indication state specific medium access control control element, an intra-cell medium access control control element, or a lower layer triggered mobility medium access control control element.

In accordance with one example embodiment, an apparatus may comprise: circuitry configured to perform: receiving an indication to activate one or more transmission configuration indication states associated with at least one of: a source cell, or at least one target cell; and circuitry configured to perform: updating a list of activated transmission configuration indication states based, at least partially, on the received indication.

In accordance with one example embodiment, an apparatus may comprise: processing circuitry; memory circuitry including computer program code, the memory circuitry and the computer program code configured to, with the processing circuitry, enable the apparatus to: receive an indication to activate one or more transmission configuration indication states associated with at least one of: a source cell, or at least one target cell; and update a list of activated transmission configuration indication states based, at least partially, on the received indication.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: receiving an indication to activate one or more transmission configuration indication states associated with at least one of: a source cell, or at least one target cell; and updating a list of activated transmission configuration indication states based, at least partially, on the received indication.

The indication may be received via a medium access control control element.

The means may be further configured to perform: receiving a lower layer triggered mobility configuration for the at least one target cell.

The means may be further configured to perform: receiving an indication of a codepoint value of the list of activated transmission configuration indication states; and determining a transmission configuration indication state of the list of activated transmission configuration indication states based, at least partially, on the indicated codepoint value.

The determined transmission configuration indication state may be configured to be used as an indicated beam for the at least one target cell.

The indication of the codepoint value may further comprise a lower layer triggered mobility flag.

The determined transmission configuration indication state may be configured to be used as an indicated beam for the source cell.

The indication of the codepoint value may be received via a downlink control information message.

An indexing of the list of activated transmission configuration indication states may be configured to be restarted based, at least partially, on a maximum number of codepoint values contained in the list of activated transmission configuration indication states.

The means may be further configured to perform: receiving an indication to reset the list of activated transmission configuration indication states; and removing activated transmission configuration indication states from the list of transmission configuration indication states in response to the indication to reset the list.

The indication may comprise an indication to reset the list of activated transmission configuration indication states, wherein the means may be further configured to perform: removing at least one activated transmission configuration indication state from the list of transmission configuration indication states in response to the indication to reset the list; and activating the one or more transmission configuration indication states provided with the indication.

The indication may comprise an indication to combine the one or more transmission configuration indication states with the list of activated transmission configuration indication states.

The indication may comprise an indication to increment the list of activated transmission configuration indication states with the one or more transmission configuration indication states.

The means may be further configured to perform: adding the one or more transmission configuration indication states to the list of activated transmission configuration indication states, after at least one transmission configuration indication state that is in the list of activated transmission configuration indication states, starting at a next codepoint value.

The indication may comprise an identifier of the list of activated transmission configuration indication states.

The indication may comprise an indication of a starting codepoint value for adding the one or more transmission configuration indication states to the list of activated transmission configuration indication states.

The indication may be received via one of: a transmission configuration indication state specific medium access control control element, an intra-cell medium access control control element, or a lower layer triggered mobility medium access control control element.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: cause receiving of an indication to activate one or more transmission configuration indication states associated with at least one of: a source cell, or at least one target cell; and update a list of activated transmission configuration indication states based, at least partially, on the received indication.

In accordance with one example embodiment, a non-transitory computer-readable medium comprising program instructions stored thereon for performing at least the following: causing receiving of an indication to activate one or more transmission configuration indication states associated with at least one of: a source cell, or at least one target cell; and updating a list of activated transmission configuration indication states based, at least partially, on the received indication.

In accordance with another example embodiment, a non-transitory program storage device readable by a machine may be provided, tangibly embodying instructions executable by the machine for performing operations, the operations comprising: causing receiving of an indication to activate one or more transmission configuration indication states associated with at least one of: a source cell, or at least one target cell; and updating a list of activated transmission configuration indication states based, at least partially, on the received indication.

In accordance with another example embodiment, a non-transitory computer-readable medium comprising instructions that, when executed by an apparatus, cause the apparatus to perform at least the following: causing receiving of an indication to activate one or more transmission configuration indication states associated with at least one of: a source cell, or at least one target cell; and updating a list of activated transmission configuration indication states based, at least partially, on the received indication.

A computer implemented system comprising: at least one processor and at least one non-transitory memory storing instructions that, when executed by the at least one processor, cause the system at least to perform: causing receiving of an indication to activate one or more transmission configuration indication states associated with at least one of: a source cell, or at least one target cell; and updating a list of activated transmission configuration indication states based, at least partially, on the received indication.

A computer implemented system comprising: means for causing receiving of an indication to activate one or more transmission configuration indication states associated with at least one of: a source cell, or at least one target cell; and means for updating a list of activated transmission configuration indication states based, at least partially, on the received indication.

In accordance with one example embodiment, an apparatus may comprise: at least one processor; and at least one memory storing instructions that, when executed by the at least one processor, cause the apparatus at least to: transmit, to a user equipment, an indication to activate one or more transmission configuration indication states associated with at least one of: a source cell, or at least one target cell; and transmit, to the user equipment, an indication of a codepoint value of a list of activated transmission configuration indication states.

The example apparatus may be further configured to: transmit, to the at least one target cell, at least one message with respect to at least one transmission configuration indication state associated with the at least one target cell.

The indication to activate the one or more transmission configuration indication states may be transmitted via a medium access control control element.

The example apparatus may be further configured to: transmit, to the user equipment, a lower layer triggered mobility configuration.

The codepoint value of the list of activated transmission configuration indication states may be associated with a transmission configuration indication state that is configured to be used as an indicated beam for the at least one target cell.

The indication of the codepoint value may further comprise a lower layer triggered mobility flag.

The codepoint value of the list of activated transmission configuration indication states may be associated with a transmission configuration indication state that is configured to be used as an indicated beam for the source cell.

The indication of the codepoint value may be transmitted via a downlink control information message.

The indication to activate the one or more transmission configuration indication states may comprise an indication to reset the list of activated transmission configuration indication states and activate the one or more transmission configuration indication states in the list of activated transmission configuration indication states.

The example apparatus may be further configured to: transmit, to the user equipment, an indication to reset the list of activated transmission configuration indication states without activating at least one transmission configuration indication state in the list of activated transmission configuration indication states.

The indication to activate the one or more transmission configuration indication states may comprise an indication to increment the list of activated transmission configuration indication states with the one or more transmission configuration indication states.

The indication to activate the one or more transmission configuration indication states may comprise an identifier of the list of activated transmission configuration indication states.

The indication to activate the one or more transmission configuration indication states may comprise an indication of a starting codepoint value for adding the one or more transmission configuration indication states to the list of activated transmission configuration indication states.

The indication to activate the one or more transmission configuration indication states may be transmitted via one of: a transmission configuration indication state specific medium access control control element, an intra-cell medium access control control element, or a lower layer triggered mobility medium access control control element.

In accordance with one aspect, an example method may be provided comprising: transmitting, by a base station to a user equipment, an indication to activate one or more transmission configuration indication states associated with at least one of: a source cell, or at least one target cell; and transmitting, to the user equipment, an indication of a codepoint value of a list of activated transmission configuration indication states.

The example method may further comprise: transmitting, to the at least one target cell, at least one message with respect to at least one transmission configuration indication state associated with the at least one target cell.

The indication to activate the one or more transmission configuration indication states may be transmitted via a medium access control control element.

The example method may further comprise: transmitting, to the user equipment, a lower layer triggered mobility configuration.

The codepoint value of the list of activated transmission configuration indication states may be associated with a transmission configuration indication state that is configured to be used as an indicated beam for the at least one target cell.

The indication of the codepoint value may further comprise a lower layer triggered mobility flag.

The codepoint value of the list of activated transmission configuration indication states may be associated with a transmission configuration indication state that is configured to be used as an indicated beam for the source cell.

In accordance with one example embodiment, an apparatus may comprise: circuitry configured to perform: transmitting, to a user equipment, an indication to activate one or more transmission configuration indication states associated with at least one of: a source cell, or at least one target cell; and circuitry configured to perform: transmitting, to the user equipment, an indication of a codepoint value of a list of activated transmission configuration indication states.

The indication of the codepoint value may be transmitted via a downlink control information message.

The indication to activate the one or more transmission configuration indication states may comprise an indication to reset the list of activated transmission configuration indication states and activate the one or more transmission configuration indication states in the list of activated transmission configuration indication states.

The example method may further comprise: transmitting, to the user equipment, an indication to reset the list of activated transmission configuration indication states without activating at least one transmission configuration indication state in the list of activated transmission configuration indication states.

The indication to activate the one or more transmission configuration indication states may comprise an indication to increment the list of activated transmission configuration indication states with the one or more transmission configuration indication states.

The indication to activate the one or more transmission configuration indication states may comprise an identifier of the list of activated transmission configuration indication states.

The indication to activate the one or more transmission configuration indication states may comprise an indication of a starting codepoint value for adding the one or more transmission configuration indication states to the list of activated transmission configuration indication states.

The indication to activate the one or more transmission configuration indication states may be transmitted via one of: a transmission configuration indication state specific medium access control control element, an intra-cell medium access control control element, or a lower layer triggered mobility medium access control control element.

In accordance with one example embodiment, an apparatus may comprise: processing circuitry; memory circuitry including computer program code, the memory circuitry and the computer program code configured to, with the processing circuitry, enable the apparatus to: transmit, to a user equipment, an indication to activate one or more transmission configuration indication states associated with at least one of: a source cell, or at least one target cell; and transmit, to the user equipment, an indication of a codepoint value of a list of activated transmission configuration indication states.

In accordance with one example embodiment, an apparatus may comprise means for performing: transmitting, to a user equipment, an indication to activate one or more transmission configuration indication states associated with at least one of: a source cell, or at least one target cell; and transmitting, to the user equipment, an indication of a codepoint value of a list of activated transmission configuration indication states.

The means may be further configured to perform: transmitting, to the at least one target cell, at least one message with respect to at least one transmission configuration indication state associated with the at least one target cell.

The indication to activate the one or more transmission configuration indication states may be transmitted via a medium access control control element.

The means may be further configured to perform: transmitting, to the user equipment, a lower layer triggered mobility configuration.

The codepoint value of the list of activated transmission configuration indication states may be associated with a transmission configuration indication state that is configured to be used as an indicated beam for the at least one target cell.

The indication of the codepoint value may further comprise a lower layer triggered mobility flag.

The codepoint value of the list of activated transmission configuration indication states may be associated with a transmission configuration indication state that is configured to be used as an indicated beam for the source cell.

The indication of the codepoint value may be transmitted via a downlink control information message.

The indication to activate the one or more transmission configuration indication states may comprise an indication to reset the list of activated transmission configuration indication states and activate the one or more transmission configuration indication states in the list of activated transmission configuration indication states.

The means may be further configured to perform: transmitting, to the user equipment, an indication to reset the list of activated transmission configuration indication states without activating at least one transmission configuration indication state in the list of activated transmission configuration indication states.

The indication to activate the one or more transmission configuration indication states may comprise an indication to increment the list of activated transmission configuration indication states with the one or more transmission configuration indication states.

The indication to activate the one or more transmission configuration indication states may comprise an identifier of the list of activated transmission configuration indication states.

The indication to activate the one or more transmission configuration indication states may comprise an indication of a starting codepoint value for adding the one or more transmission configuration indication states to the list of activated transmission configuration indication states.

The indication to activate the one or more transmission configuration indication states may be transmitted via one of: a transmission configuration indication state specific medium access control control element, an intra-cell medium access control control element, or a lower layer triggered mobility medium access control control element.

In accordance with one example embodiment, a non-transitory computer-readable medium comprising instructions stored thereon which, when executed with at least one processor, cause the at least one processor to: cause transmitting, to a user equipment, of an indication to activate one or more transmission configuration indication states associated with at least one of: a source cell, or at least one target cell; and cause transmitting, to the user equipment, of an indication of a codepoint value of a list of activated transmission configuration indication states.

In accordance with one example embodiment, a non-transitory computer-readable medium comprising program instructions stored thereon for performing at least the following: causing transmitting, to a user equipment, of an indication to activate one or more transmission configuration indication states associated with at least one of: a source cell, or at least one target cell; and causing transmitting, to the user equipment, of an indication of a codepoint value of a list of activated transmission configuration indication states.

In accordance with another example embodiment, a non-transitory program storage device readable by a machine may be provided, tangibly embodying instructions executable by the machine for performing operations, the operations comprising: causing transmitting, to a user equipment, of an indication to activate one or more transmission configuration indication states associated with at least one of: a source cell, or at least one target cell; and causing transmitting, to the user equipment, of an indication of a codepoint value of a list of activated transmission configuration indication states.

In accordance with another example embodiment, a non-transitory computer-readable medium comprising instructions that, when executed by an apparatus, cause the apparatus to perform at least the following: causing transmitting, to a user equipment, of an indication to activate one or more transmission configuration indication states associated with at least one of: a source cell, or at least one target cell; and causing transmitting, to the user equipment, of an indication of a codepoint value of a list of activated transmission configuration indication states.

A computer implemented system comprising: at least one processor and at least one non-transitory memory storing instructions that, when executed by the at least one processor, cause the system at least to perform: causing transmitting, to a user equipment, of an indication to activate one or more transmission configuration indication states associated with at least one of: a source cell, or at least one target cell; and causing transmitting, to the user equipment, of an indication of a codepoint value of a list of activated transmission configuration indication states.

A computer implemented system comprising: means for causing transmitting, to a user equipment, of an indication to activate one or more transmission configuration indication states associated with at least one of: a source cell, or at least one target cell; and means for causing transmitting, to the user equipment, of an indication of a codepoint value of a list of activated transmission configuration indication states.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

The invention claimed is:

1. An apparatus comprising:

at least one processor; and at least one non-transitory memory storing instructions that, when executed by the at least one processor, cause the apparatus at least to:

receive an indication to activate one or more transmission configuration indication states associated with at least one of:

a source cell, or at least one target cell; and update a list of activated transmission configuration indication states based, at least partially, on the received indication, wherein an indexing of the list of activated transmission configuration indication states is configured to be restarted based, at least partially, on a maximum number of codepoint values contained in the list of activated transmission configuration indication states.

2. The apparatus of claim 1, wherein the indication is received via a medium access control control element.

3. The apparatus of claim 1, wherein the at least one memory stores instructions that, when executed by the at least one processor, cause the apparatus to:

receive a lower layer triggered mobility configuration for the at least one target cell.

4. The apparatus of claim 1, wherein the at least one memory stores instructions that, when executed by the at least one processor, cause the apparatus to:

receive an indication of a codepoint value of the list of activated transmission configuration indication states; and determine a transmission configuration indication state of the list of activated transmission configuration indication states based, at least partially, on the indicated codepoint value.

5. The apparatus of claim 1, wherein the list of activated transmission configuration indication states is continuously codepoint indexed.

6. The apparatus of claim 1, wherein the at least one memory stores instructions that, when executed by the at least one processor, cause the apparatus to:

receive an indication to reset the list of activated transmission configuration indication states; and remove activated transmission configuration indication states from the list of transmission configuration indication states in response to the indication to reset the list.

7. The apparatus of claim 1, wherein the indication comprises an indication to reset the list of activated transmission configuration indication states, wherein the at least one memory stores instructions that, when executed by the at least one processor, cause the apparatus to:

remove at least one activated transmission configuration indication state from the list of transmission configuration indication states in response to the indication to reset the list; and activate the one or more transmission configuration indication states provided with the indication.

8. The apparatus of claim 1, wherein the indication comprises an indication to combine the one or more transmission configuration indication states with the list of activated transmission configuration indication states.

9. The apparatus of claim 1, wherein the indication comprises an indication to increment the list of activated transmission configuration indication states with the one or more transmission configuration indication states.

10. The apparatus of claim 1, wherein the indication comprises an identifier of the list of activated transmission configuration indication states.

11. The apparatus of claim 1, wherein the indication comprises an indication of a starting codepoint value for adding the one or more transmission configuration indication states to the list of activated transmission configuration indication states.

12. The apparatus of claim 1, wherein the indication is received via one of:

a transmission configuration indication state specific medium access control control element, an intra-cell medium access control control element, or a lower layer triggered mobility medium access control control element.

13. A method comprising:

receiving, by a user equipment, an indication to activate one or more transmission configuration indication states associated with at least one of:

a source cell, or at least one target cell; and updating a list of activated transmission configuration indication states based, at least partially, on the received indication, wherein an indexing of the list of activated transmission configuration indication states is configured to be restarted based, at least partially, on a maximum number of codepoint values contained in the list of activated transmission configuration indication states.

* * * * *